United States Patent
Krastchew

[15] 3,681,628
[45] Aug. 1, 1972

[54] COOLING ARRANGEMENT FOR A DYNAMOELECTRIC MACHINE

[72] Inventor: Christoslaw Krastchew, 44 W. 63rd St. Apt. 626, New York, N.Y. 10023

[22] Filed: Sept. 14, 1970

[21] Appl. No.: 71,919

[52] U.S. Cl.....................310/54, 310/52
[51] Int. Cl..............................H02k 9/20
[58] Field of Search..........310/54, 52, 57, 58, 64, 40, 310/55, 59

[56] References Cited

UNITED STATES PATENTS

| | | | |
|---|---|---|---|
| 1,739,137 | 12/1929 | Gay | 310/52 |
| 2,390,130 | 12/1945 | Sigmund et al. | 310/54 |
| 2,898,484 | 8/1959 | Krastchew | 310/54 X |
| 3,014,139 | 12/1961 | Shildneck | 310/64 |
| 3,217,193 | 11/1965 | Rayner | 310/54 |
| 3,469,126 | 9/1969 | Wiedemann | 310/54 |
| 2,386,701 | 10/1945 | Martin | 310/54 X |
| 2,217,430 | 10/1940 | Baudry | 310/54 |
| 2,999,951 | 9/1961 | Flynn | 310/54 |

Primary Examiner—Lewis H. Myers
Assistant Examiner—U. Weldon
Attorney—Michael S. Striker

[57] ABSTRACT

A turbo generator has a rotor and a stator forming an annular gap. The inner surface of the stator has teeth and intermediate recesses whose outer bottom portions are taken up by stator windings. Cooling means are provided in the unused inner recess portions which are free of stator windings. The cooling means comprise rigid holding means secured in the open inner recess portions to the adjacent inner teeth portions, and cooling pipes for a coolant supported by the holding means so that the stator and rotor portions bounding the gap are efficiently cooled which is particularly advantageous when the rotor and stator windings are internally cooled.

31 Claims, 21 Drawing Figures

PATENTED AUG 1 1972

INVENTOR
CHRISTOSLAV KRATCHEV
BY Herman S. Halyr
ATTORNEY

PATENTED AUG 1 1972 3,681,628

INVENTOR
CHRISTOSLAV KRATCHEW

BY
[signature]
ATTORNEY

3,681,628

COOLING ARRANGEMENT FOR A DYNAMOELECTRIC MACHINE

BACKGROUND OF THE INVENTION

The present invention relates to fully liquid cooled electric machines whose stator and rotor windings and cores are internally liquid cooled, and in which no hydrogen is used for cooling purposes. A machine of this type is disclosed in my U.S. Pats. Nos. 2,898,484 and 3,240,967. In the latter patent a fully liquid cooled machine is described whose rotor runs in a partial vacuum, while the U.S. Pat. No. 2,898,484 discloses a liquid cooling of the rotor and stator windings.

In internally cooled turbogenerators of this type, hydrogen is not used at all as a coolant and windage loss reducing agent. In this type of turbogenerators, as well as in high speed salient pole generators, synchronous condensers, and induction motors, all heat producing components, such as rotor and stator windings and cores, are internally liquid cooled by circulating a liquid for example water.

Internally liquid cooled rotors, in which the windings have inner ducts for the coolant, are already in successful commercial operation. Due to the great increase in electric consumption, which doubles every 10 years, it is expected that turbogenerator units will have ratings of 1,500 MW for 3,600 RPM machines, and 2,500 MW for 1,800 RPM machines within 10 years. If such machines were cooled with hydrogen, they would require an increase of the hydrogen pressure, or additional complication in design, creating undesirable sealing problems, and safety and explosion hazard, in addition to higher windage losses.

As the generator capacity increases, ever larger quantities of heat caused by losses have to be removed from machines having almost the same physical size. An increase of the rating of a generator is accompanied by an increase of the rotor ampere windings, or of the rotor voltage. In order to obtain the same test and operational safety for the insulation of the rotor windings, in accordance with Paschen's Law, the vacuum in the rotor space of a fully liquid cooled machine must be lowered in the same proportion in which the rotor voltage is increased.

Furthermore, an increase in the specific power of modern large turbogenerators, mainly involves increased specific current loadings which cause higher leakage fluxes. One major stray loss, which is an important part of the total loss, is the loss occurring on the surface of the stator and rotor due to air gap fields and their harmonics of higher frequency which have a particularly high concentration on the smaller rotor surface.

During normal operations, a turbogenerator may also be affected by many different types of transient abnormal conditions, such as an assymetrical short circuit, phase openings, and the like, producing eddy-currents, and heat losses in the rotor. The same is true during suddenly occurring exciter forcing operations. Furthermore, the generator may be subjected to a certain permissible short or long time phase unbalanced load operation, caused by an unbalanced transmission line impedance.

During such electrically assymetrical conditions, electric heat losses occur on the rotor surface, due to the negative sequence stator current which creates in the air gap a magnetic field which rotates at the same speed, but in a direction opposite to that of the normal field. Depending on the phase unbalanced load value and other design factors, the losses on the rotor surface on a modern large turbogenerator may be in the order of many hundreds of kilowatts.

The difficulties with losses on the rotor surface, are becoming more noticeable due to the tendency to decrease the short circuit ratio SCR to about 0.40 or even less in modern turbogenerators, which is done for economic reasons. As a consequence, the air gap width is greatly reduced, resulting in higher losses at the rotor surface in the wedges and retaining rings holding the windings, and in damper windings.

It is known to mount a cylindrical tube of insulating material in the air gap in order to divide the interior of the casing into a rotor space and a stator space, for various reasons. As a consequence of the reduction of the short circuit ratio, the air gap width may become so small that no insulating tube can be mounted in the air gap. For example, the air gap width of a generator having a short circuit ratio of 0.42 and about 900 MVA capacity, maybe only 3 inches not considering the larger diameter of the retaining rings of the rotor. This compares with an air gap width of about 6 inches for a short circuit ratio of 0.8.

During the prosecution of my U.S. Pat. No. 2,898,484, I have described the partitioning of the air gap by a cylinder tube of insulating material as early as 1955. However, in my U.S. Pat. No. 3,240,967, I have disclosed a different arrangement for partitioning the interior of the casing of the generator by two tubular bodies extending from the stator core ends to the end walls of the casing, and such an arrangement can be used also in electric machines having a small air gap.

Due to the presence of strong magnetic fluxes and vibrations in the limited air gap of turbogenerators with a low short circuit ratio, especially in synchronous machines with laminated poles and in induction motors having a very small air gap, it may be not possible to use an insulating cylinder tube made of fiberglass reinforced synthetic resin, with or without cooling pipes in the rotor space within the cylinder. It may be necessary to use a relatively thin cylinder made of non-magnetic steel, or of a metal having low electric losses, or even a non-destructive cover of thermosetting resin applied over the stator core bore and/or body to ensure that no air or gas from the stator space will infiltrate into the rotor space through the stator core laminates which is the case if no special precaution is taken.

However, the division of the interior of the casing of the generator into an inner annular rotor space and an outer annular stator space by means of a stiff cylinder located in the air gap is well known for many decades and such division has been very often suggested with different design ideas.

SUMMARY OF THE INVENTION

It is the principal object of the present invention to overcome the disadvantages of known cooling arrangements for rotary electric machines, and to provide a cooling arrangement by which the stator and rotor surfaces bounding the air gap are efficiently cooled.

Another object of the invention, is to cool the annular stator and rotor portions bounding the air gap of an electric machine whose stator, rotor windings and cores are internally cooled by a liquid flowing through ducts in the rotor and stator windings and cores.

Another object of the invention is to cool the stator teeth, the air gap, the rotor surface, and the stator winding parts projecting from the ends of the stator core, in addition to internally liquid cooling the rotor and stator windings and cores.

Another object of the invention is to improve the cooling of a generator in such a manner that the rating of a turbogenerator can be increased with the available limited possibilities by increasing the dimensions of the rotor whose diameter is limited by the action of the centrifugal force, and whose length is limited by vibrations.

Another object of the invention is to provide cooling means for the removal of heat generated in the stator teeth and the rotor surface by normally occurring eddy current losses which may occur as a result of the fields in the air gap, and of low pressure in the air gap, or due to magnetic fields caused by abnormal assynchronous operations or by phase unbalanced load operation of the electric machine.

Another object of the invention is to combine the removal of heat by internally cooling the rotor and stator windings and cores, with cooling of the air gap by a liquid coolant circulating in cooling tubes, or by evaporization and condensation of liquid in heat pipes, or by spraying and evaporating a coolant in the air gap.

Another object of the invention is to use the free inner open end portions of recesses between the stator teeth, whose outer bottom portions are filled with the stator windings, for supporting cooling means in the region of the air gap.

It is also an object of the invention to mount a structure including holding means with cooling ducts, or for supporting cooling pipes in the region of the air gap.

It is also an object of the invention to use Taylor vortices produced in the air gap by the high speed rotation of the rotor, to carry vaporized particles of a sprayed liquid from the rotor space to the cooling pipes, or to cold heat pipes which cause condensation, then repeatedly evaporation and condensation in the air gap of the machine.

Although the present invention is particularly advantageously applied to fully liquid cooled machines, the invention is also applicable to all kinds of electrical machines, including fully liquid cooled synchronous condensers or water wheel generators, the rotor of which runs in air at atmospheric pressure, and in which ventilators are used for removal of heat from the stator teeth, the air gap, and from the rotor surface. When the cooling arrangement according to the present invention is applied, no ventilators are required resulting in savings in the no-load ventilating losses of the electric machine.

In accordance with the present invention, the cooling of the stator teeth, of the air gap, of the rotor surface, and of the wedges and retaining rings of the rotor, is accomplished without requiring a wide air gap space, by mounting of cooling means in the unused portions of the stator recesses or slots in whose bottom portions the stator windings are secured. Bar-shaped holding means supporting cooling pipes or having ducts for the coolant, are secured in the unused portions of the stator recesses or slots. Axially spaced holding members may also be used. The holding means and holding members preferably consist of glass-epoxy material, glass-ceramics, or other fiberglass reinforced thermo setting material. The holding means and holding members mainly serve the purpose of providing a solid, non-vibrating support for the cooling pipes in which the coolant circulates, or for heat pipes, or coolant spraying pipes. The cooling tubes or heat pipes may consist of non-magnetic steel, metal, or synthetic plastic materials having high electric resistance. The holding members may have a square or rectangular cross section, and be completely located within the stator recesses without projecting into the air gap, or may have a T-shaped cross section, with a portion projecting into the air gap and abutting the inner end faces of the stator teeth. In some embodiments, individual holding members are joined together to form a cylindrical structure which is firmly mounted in the stator bore, but allows vibrations, thermal expansion and contractions. A particular advantage of such arrangement is not only the saving of space in the region of the air gap, but facility of assembly and disassembly. In such case, only a small portion of the holding members, or one section of the cylindrical structure can be removed for replacement, or for inspection and servicing. The cooling pipes supported by the holding means, or by several holding members, are preferably parallel to the axis of the machine, but may also have any other suitable shape. A vaporizable or non-vaporizable liquid is pumped into the cooling pipes. To compensate for the current induced in the cooling pipes, they may also be connected in such a manner as to neutralize induced currents, or transposed.

A cooling arrangement according to one embodiment of the invention comprises casing means; stator means supported in the casing means and having an annular inner portion formed with teeth and with recesses between the teeth, and internally cooled stator winding means located in the outer bottom portions of the recesses partly filling the latter so that inner open recess portions remain free; rotor means mounted in the casing means for rotation and including internally cooled rotor winding means, said rotor means having an annular outer portion defining an annular gap with the annular inner portion of the stator means; and cooling means comprising conduit means for a coolant, and being at least partly located in the inner open recess portions for cooling the annular inner and outer portions bounding the air gap.

Preferably, the cooling means include holding means fixedly secured in the inner open recess portions, and supporting cooling pipes, or being formed with cooling ducts through which a coolant is circulated.

In an embodiment of the invention, each holding means includes an axially extending row of outer holding members secured to the outer part of the respective inner open recess portion, and an axially extending row of inner holding members secured to the inner part of the respective inner open recess portion, and cooling pipes are clamped between the outer and inner holding members. The outer holding members may be directly adjoining each other, or spaced in axial direction, and the inner holding members are preferably spaced from each other to expose portions of the cooling pipes to the air in the air gap.

The inner holding members may have portions projecting into the air gap and adjoining each other. It is advantageous to mount cooling pipes, or provide cooling ducts, in these projecting portions. To facilitate removal and insertion of the rotor into the stator, or removal of the rotor, the lower portion of the stator bore may be constructed only with holding members which do not project into the air gap.

It is also possible to join elongated holding members which are located in the inner open recess portions, by annular means, forming a cylindrical structure.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 4 is a fragmentary cross-sectional view illustrating a stator provided with a third embodiment of the invention, and including FIGS. 4a and 4b illustrating modified arrangements;

DESCRIPTION OF THE PREFERRED EMBODIMENTS

Figure 1:
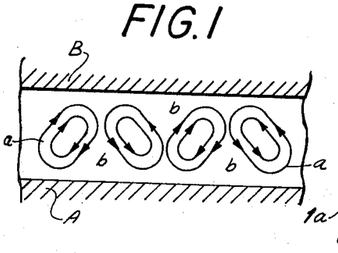
FIG. 1 is a fragmentary axial sectional view illustrating the vortex pattern in the air gap between a rotor and a stator.

FIG. 1 shows annular, three-dimensional rotating Taylor vortices $a$ and turbulent regions $b$ in the air gap between an inner rotor A running at high speed, and an outer stationary stator B. There is no axial flow in the air gap, and the Reynolds number is 0. Contrary to air or hydrogen cooled machines in which a coolant is forced through the gap, the turbogenerators to which the present invention is applied, have no axial and radial flow, and almost no renewal of the fluid, air or gas, entrapped in the air gap of a generator having internally cooled windings. Generators of this type with usually partially evacuated rotor spaces, or running in a low density gas, or even at atmospheric pressure, entirely depend on the heat transfer by radiation between the stator and rotor surfaces bounding the air gap, and by convection due to the intense mixing action in the turbulent area $b$ of the vortices $a$ forming in the air gap due to the high speed rotation of the rotor.

Figure 2:
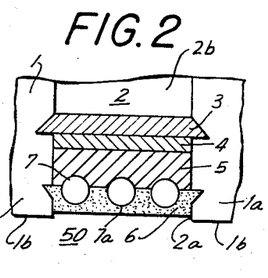
FIG. 2 is a fragmentary cross-sectional view of a stator provided with a first embodiment of the invention.
Figure 9:
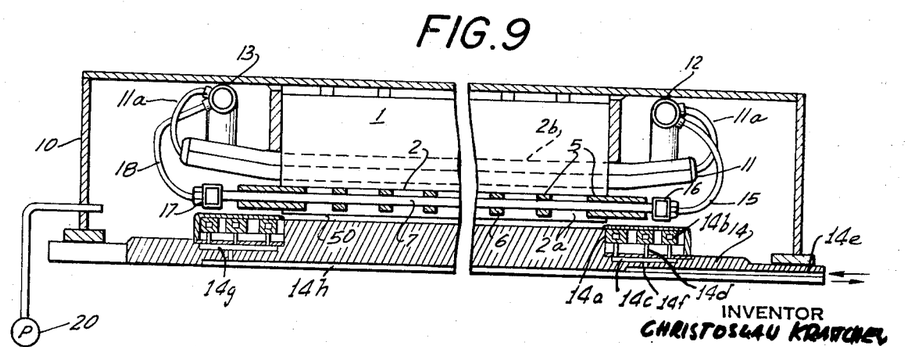
FIG. 9 is a fragmentary axial sectional view illustrating the rotor, stator and casing of an electric generator provided with the embodiment of FIG. 2.

Referring first to the embodiment of FIGS. 2 and 9, a casing 10 envelopes a stator core 1, and supports a rotor 14 for rotation in the interior of the stator core 1, forming an annular gap 50 with the same. Stator core 1 has an inner anular portion formed by circumferential spaced axially extending teeth 1a which form between each other recesses or slots 2 in which stator windings 2b are located, which are held in place by stator winding wedges 3 which are located outward of the extremities 1b of the stator teeth 1a so that inner open recess portions 2a bounded by teeth 1a and stator winding wedges 3 remain free and unused.

A plurality of spaced outer rigid holding members 5, and inner holding members 6 is provided in each inner open recess portion 2a, forming pairs spaced from each other in axial direction, as shown in FIG. 9. An additional spacing member 4 may be provided between the stator winding wedge 3 and the outer holding member 5 and wedged into the recess to fix the outer holding member 5 firmly in place. Registering holding members 5 and 6 are provided with confronting registering grooves 7a in which axially extending cooling pipes 7 are located which have end portions projecting beyond the ends of the stator core 1, as best seen in FIG. 9.

The inner holding members 6 are firmly wedged into the respective inner open recess portion between the adjacent inner teeth portions so that the cooling means 5, 6, 7 are reliably secured in the stator recesses. Spaced pairs of holding members 5, 6 are provided in the embodiment of FIG. 9, but as will be explained hereinafter, it is also possible to provide holding means which extend integrally along the entire axial length of each stator recess or slot 2. The inner holding member may also project inward into the air gap 50 beyond the inner ends 1b of the stator teeth 1a, but this construction can only be used in a certain portion of the stator bore where it does not interfere with the assembly and removal of the rotor when a skid is used in the lower portion of the stator bore.

The outer holding member 5 may be made of any non-magnetic material such as a glass epoxy laminate with good electric properties for use at elevated temperatures, of glass-ceramics, or of any other fiber glass reinforced thermosetting material. The inner holding member 6 may be made of the same non-magnetic material as the outer holding member 5, or of a fiberglass reinforced polyester in which non-magnetic metal particles, or even magnetic iron particles are embedded. Outer holding members 5 made with magnetizable iron particles embedded in epoxy or other thermosetting materials, reduce substantially the rotor surface losses. These materials are known to have very low electric losses and a high electric resistance.

The cooling pipes 7 are made of non-magnetic steel, metal, synthetic plastic material, or any other material having high electric resistance and low losses. The cooling pipes 7 may consist of one piece, or be put together of several sections, insulated from each other to prevent eddy currents. Cooling pipes 7 may have cooling fins, if required.

As shown in FIG. 9, the stator windings 2b have portions 11 projecting from the stator recesses 2 at the ends of the stator core 1. The coolant for the stator winding portion 11 is supplied from an inlet header 12 and connecting hoses 11a, and after passing through the inner ducts in the stator winding are discharged through hoses 11a into the outlet header 13, as disclosed in detail in my U.S. Pat. No. 2,898,484. Rotor 14 has also internally cooled windings 14a, also disclosed in detail in the above U.S. patent. As shown in FIG. 9, rotor windings 14a have central longitudinal channels 14b to which a coolant is supplied from a distributing chamber 14a through insulated conduits 14d. The coolant is supplied by an annular conduit 14e and a transverse conduit 14f to the distributing chamber 14c, and flows, after passing through channels 14b, through chamber 14g and the axial central bore 14h to an outlet.

Cooling liquid is supplied to the cooling pipes 7 from the inlet header 12 or stator core inlet header (not shown) through insulating hoses 15, inlet connector 16, and returned to outlet header 13 by means of the outlet connector 17 and insulating hose 18. The interior of casing 10, and thereby air gap 50, is advantageously evacuated by a pump or exhauster 20, or may be filled with a relatively small quantity of gas as disclosed in my U.S. Pat. No. 3,240,967. However, normal atmospheric air pressure may prevail in the casing 10, in which event the pump 20 is not required.

It will be seen that due to the spacing between the pairs of holding members 5 and 6, portions of cooling pipes 7, located in open recess portions 2a directly cool the air located in gap 50.

Figure 3:
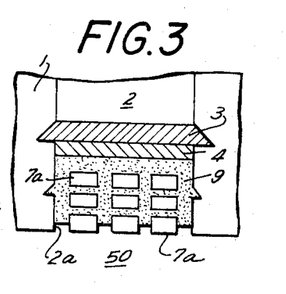
FIG. 3 is a fragmentary cross-sectional view of a stator provided with a second embodiment of the invention.

In the embodiment of FIG. 3, cooling tubes 7a have a rectangular cross-section and are embedded, or partially embedded, in the holding member 9 which is preferably made of fiberglass reinforced synthetic resin in which non-magnetic metal particles, or magnetizable iron particles are embedded. The cooling means 9, 7a may be fabricated as a bar-shaped structure extending along the entire length of the stator core, and then inserted into the stator recesses, but it is also possible to cast cooling means 9, 7a directly in the stator recess. The innermost cooling pipes 7a, which are only partly embedded in the holding means 9, are directly exposed to the air in the air gap 50.

Figure 4A:
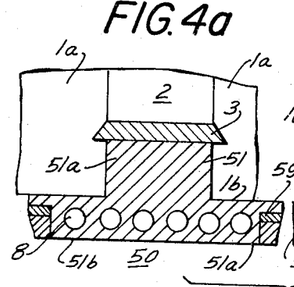
Figure 4B:
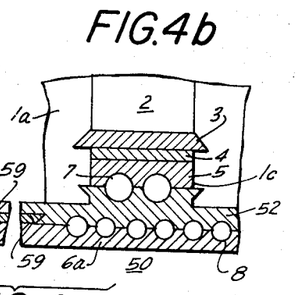

In the embodiment of FIG. 4, the cooling means which are located in each recess or slot 2, have a T-shaped cross-section, so that the inner portion of each holding means projects into the regions of the inner end faces 1b of the stator teeth, abutting the holding means which is fixed in the adjacent recess 2 so that the outer annular part of air gap 50 is taken up by the inwardly projecting portions of the holding means. In the modification shown in FIG. 4a, a cast integral holding means 51 has an outer portion 51a secured in the inner open recess portion inwardly of the stator winding wedge 3, and an inner portion 51b projecting into the air gap 50, and also axially projecting to cover halves of the end faces 1b of adjacent stator teeth 1a. Cooling pipes 8 are embedded in the inner projecting portion 51b, for efficient cooling of the air in the air gap 50. The modification shown in FIG. 4b has a holding member 4, an outer holding member 5 cooperating with an intermediate holding member 52 to clamp cooling pipes 7 in the inner recess portion 1c, and an inner holding member 6a which, together with the intermediate holding member 52, clamps a row of axially extending cooling pipes 8.

To ensure fluid tightness and flexibility of such cylindrical structure, flexible member 59, made of rubber or other flexible material, may be inserted between each adjacent holding member 51, 52 and 6a. For the same reason, flexible material can be used to interconnect adjacent holding members in the other embodiments of the invention.

Figure 5:
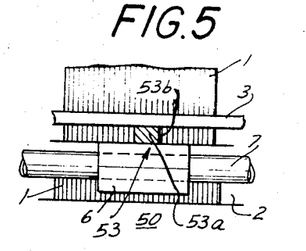
FIG. 5 is a fragmentary axial sectional view of a stator provided with a modification of FIG. 2 or FIG. 8.

Referring now to FIG. 5, pairs of outer holding members 53 and inner holding members 6, are secured in the stator recesses. The outer holding member 53 has a narrow outer projection 53a abutting the stator winding holding wedge 3, and is preferably made as a divided ring consisting of two or more segments of glass epoxy laminate, having a smaller diameter than that of the stator bore, and an outside diameter equal to the diameter at which the stator winding wedges 3 are disposed.

After the installation of the stator windings, not shown, and assembly of the stator winding wedges 3, the ring segments of which the outer holding member 53, 53a is formed, are inserted into specially provided circular recesses 53b provided in the stator core 1. Depending on the length of the stator core and the thickness of the cooling pipes 7, occurring vibrations, and other factors, each stator core 1 may have different numbers of circular recesses 35b axially spaced from each other for receiving and supporting the holding rings 53. After the individual segments of each holding ring 53, 53a have been fastened or bonded together to form strong circular rings, which are tightly and permanently secured between stator teeth laminates 1, the cooling pipes 7 are mounted on the inner surfaces of the holding rings 53 and secured in place by the inner holding members 6, leaving the surface of the stator bore free for installation and removal of the rotor.

Figure 6:
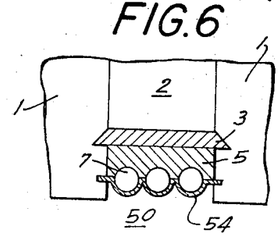
FIG. 6 is a fragmentary cross-sectional view of a stator provided with a fourth embodiment of the invention.

In the embodiment of FIG. 6, the outer holding member 5 is secured as described with reference to FIG. 2, but the inner holding member 54 is made of a plate bent to form grooves, cooperating with similar registering grooves in outer holding member 5 to hold cooling pipes 7 in place. The inner holding member 54 is made of a relatively thin sheet of non-magnetic steel, or of a metal having high electric resistance, and has a good contact with the cooling pipes 7. For further increase of the heat transfer by convection, particularly in fully liquid cooled machines running in air at atmospheric pressure, the inner holding member 54 is preferably provided with cooling fins, not shown, located in the stator recess, or projecting into the air gap 50. To prevent a metalic connection between the stator teeth laminates 1, the outer cooling members 54, are insulated by an insulating coating, such as paint.

Figure 7:
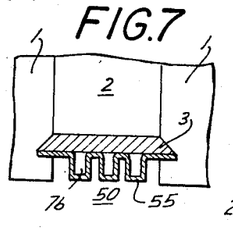
FIG. 7 is a fragmentary cross-sectional view of a stator provided with a modification of the embodiment of FIG. 6.

In the embodiment of FIG. 7, cooling pipes 7b of rectangular cross-section directly abut the stator winding holding wedge 3, and are held in place by an inner member 55 bent to form grooves or recesses into which the cooling pipes 7b fit. The inner holding member 55 is made of a thin non-magnetic sheet so that heat transfer in the air gap 50 is improved.

Figure 8:
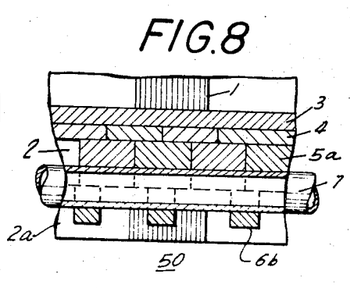
FIG. 8 is a fragmentary cross-sectional view of a stator according to another embodiment.
Figure 10:
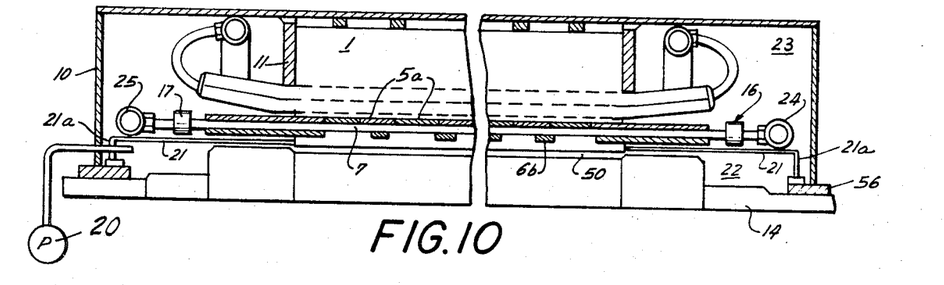
FIG. 10 is a fragmentary axial sectional view of an electric generator provided with the embodiment of FIG. 8 and including means for forming an inner evacuated space in the casing.

FIGS. 10 and 8 illustrate an embodiment in which the outer holding members 5a abut each other along the entire length of the stator core 1 and of the respective stator recess 2. The inner holding members 6b are spaced from each other in axial direction so that parts of the cooling pipes which are clamped between the inner and outer holding members, as described with reference to FIG. 2, are partly exposed and in direct contact with the air in air gap 50.

While the modification shown in FIG. 8 can be applied to the electric generator shown in FIG. 9, a modified arrangement is shown in FIG. 10 according to which a pair of tubular walls 21 projects from the ends of stator core 1 surrounding rotor 14 and being connected to the bearings 56 in casing 10 to form an inner space 22 in which rotor 14 runs, and which includes the air gap 50. The inner space 22 is evacuated by the pump or exhauster 20, and may be then filled with a special gas, such as helium. Instead of being provided with inner flanges 21a, the tubular walls 21 may be extended to the end walls of casing 10.

Due to the fact that the outer holding members 5a abut each other, they form a continuous support within the entire stator slot, preventing vibrations of the cooling pipes 7. The axially spaced inner holding members 6b ensure a direct contact of the cooling pipes 7 with the turbulent action of the Taylor vortices forming in the air gap. Cooling liquid is supplied to cooling pipes 7 by the inlet header 24, and inlet connecting member 16, and returned to the outlet header 25 by the outlet connecting member 17. Connecting members 16 and 17 may be omitted. As compared with the arrangement of FIG. 9, the embodiment of FIG. 10 provides separate headers for the cooling liquid flowing through the stator winding, and through the cooling pipes.

Figures 11, 12, 16, 17, 18, 19:
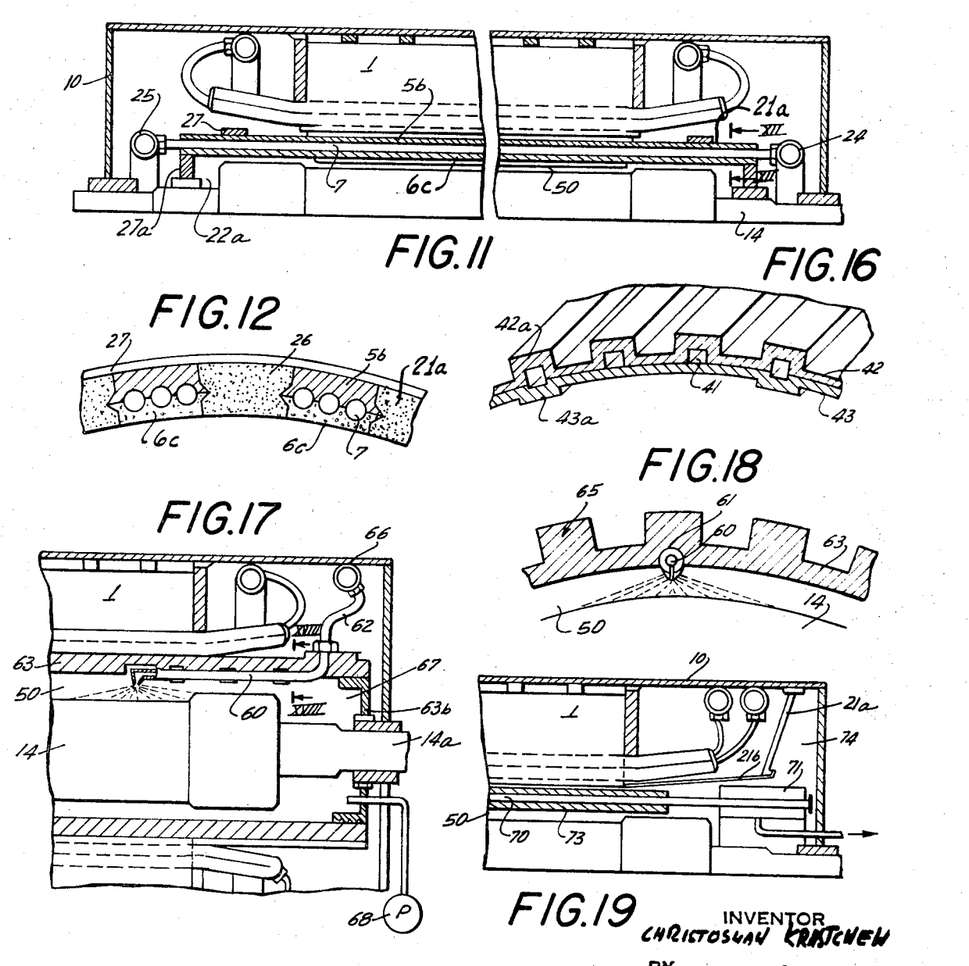
FIG. 11 is a fragmentary axial sectional view of an electric machine provided with a modified embodiment of the invention in which an evacuated inner space is formed in the casing by the cooling means of the invention.
FIG. 12 is a fragmentary cross-sectional view along line XII—XII in FIG. 11.
FIG. 16 is a fragmentary cross-sectional view illustrating another embodiment of the invention forming a cylindrical structure.
FIG. 17 is a fragmentary axial sectional view of an electrical generator provided with a further embodiment of the invention.
FIG. 18 is a fragmentary cross-sectional view taken on line XVIII—XVIII in FIG. 17.
FIG. 19 is a fragmentary sectional view of a generator provided with a further embodiment of the invention employing heat pipes.

In the embodiment of FIGS. 11 and 12, outer holding members 5b and inner holding members 6c extend in each stator recess or slot along the entire length of the stator core 1, and beyond the same. The cross-section of each stator recess corresponds to the cross-section shown in FIG. 2. Between each pair of bar-shaped elongated axially extending outer and inner holding members, cooling pipes 7 are clamped in each stator recess. Each pair of outer and inner holding members and the cooling pipes 7 between the same, constitutes a bar-shaped cooling means whose end portions project beyond the ends of the stator core 1, spaced from each other in circumferential direction. Between these end portions, which are best seen in FIG. 12, axially extending connecting bars 26 are inserted to form with holding members 5b, 6c two tubular walls 21a which are further held together by rings 27. Connecting bars 26 are held together by inner rings 27 and form thus a cylindrical structure which seals an inner space 22a in which rotor 14 runs, and which may be evacuated, as described with reference to FIG. 10. Inlet header 24 and outlet header 25 are provided at the ends of the straight cooling pipes 7, as described with reference to FIG. 10. Rings 27 consist of a non-magnetic material.

The above-described embodiments have inner holding members which do not project into the air gap, and which project only into axial sections of the air gap. For a generator with a relatively large air gap, it is advantageous to join the cooling means of the invention in a structure which is capable of supporting additional cooling tubes, located in the air gap, as shown in FIG. 4. Such a cooling structure is easily removable, and permits the insertion of the rotor into the stator, and removal of the rotor, without damage to the cooling structure.

Figure 13:
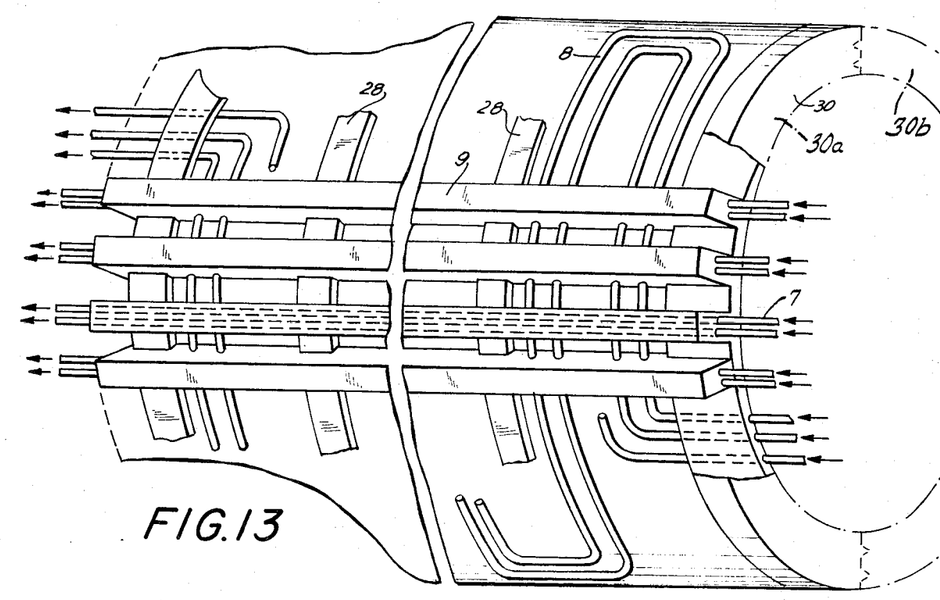
FIG. 13 is a fragmentary perspective view illustrating an embodiment of the invention in which the cooling means form a cylindrical structure.

FIG. 13 shows schematically a cylindrical cooling structure according to the invention. The stator and rotor are not shown in FIG. 13 for the sake of clarity. In each stator recess 2, and more particularly in the free inner portion 2a thereof which is not filled by the stator winding 2b and by the holding wedge 3, as described with reference to FIG. 2, a bar-shaped holding means 9, as shown in FIG. 13 may be located in which a pair of cooling pipes 7 is embedded which may be longitudinally inserted into the holding means 9, or corresponding ducts may be cast together with holding means 9. Each holding means 9 may also consist of two holding members between which cooling pipes 7 are clamped, as described with reference to FIGS. 11 and 12, but the inner and outer bar-shaped holding members must be bonded together.

Axially spaced rings 28 connect the bar-shaped holding means 9 to each other, and are connected to the inner portions of the holding means 9. The ends of the holding means 9 are connected by rings 30. Rings 28 and 30 may also consist of two segments which are secured to each other, but can be separated for independently inserting each segment into the stator bore. A division into two segments 30a, 30b is shown in FIG. 13, but it will be understood that three or more segments can be provided so that parts of the cylindrical cooling structure shown in FIG. 13 can be successively inserted into the stator recesses, and then connected.

The inner portions of holding means 9 project out of the stator recesses into air gap 50, and are provided with circumferential bores through which zigzag-shaped cooling pipes 8 pass, portions of which are exposed to the air in the air gap. The inner cooling pipes 8 may be arranged in a different shape than shown in FIG. 13. Rings 28 may consist of non-magnetic steel, or cast together with the holding means 9. The inner cooling pipes 8 further increase the strength of the cylindrical cooling structure, and are preferably fixedly secured to the holding means 9, tightly fitting into the circumferential bores of holding means 9 through which cooling pipes 8 pass. The free portions of cooling pipe 8 are in direct contact with the Taylor vortices in the air gap during the operation of electric generators.

Since the cylindrical cooling structure relies on the bar-shaped holding means 9 and the segments of the rings 28 and 30 for the required structural strength, and since the holding means 9 are mounted and secured to the unused inner free recess portions of the stator, it is evident that the cooling structure of the invention can be used in a generator having a smaller air gap than required for other cooling constructions, for example with an intermediate tube in the air gap, which makes use only of the space available in the air gap, and does not use the space in the recesses between the stator teeth. This is the most important advantage of the invention, since the air gap space is in many electric machines at a premium.

Figure 14:
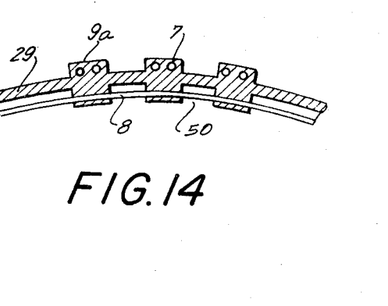
FIG. 14 is a fragmentary cross-sectional view illustrating a modification of the embodiment of FIG. 13.

FIG. 14 illustrates a modified cylindrical cooling structure in which bar-shaped holding means 9a, through which the axially extending cooling pipes or cooling ducts 7 pass, are connected to each other by a cylindrical plate 29 which may be cast, or formed of interconnected non-magnetic steel segments so that the cooling structure consists of one cylinder or two or three cylindrical segments which are separately inserted into the stator bore. The inner portions of the bar-shaped holding means 9a project into the air gap, and have circumferential bores in which the cooling pipes 8 are mounted which extend in circumferential direction in the outer portion of the air gap 50. The outer diameter of the cylindrical plate 29 is slightly less than the inner diameter of the stator bore to facilitate the insertion and removal of the cylindrical cooling structure. For the same reason, the holding means 9a are somewhat smaller than the unused portion of the stator recesses or slots 2. Evidently, the portions of holding means which project into the air gap 50 or into the stator recesses may be omitted, together with the additional cooling pipes 8.

When a cylindrical cooling structure is made of two or three segments, the individual segments are placed one by one in the stator bore, first sliding in axial direction along the upper half of the rotor in the air gap, and then in outward radial direction into the respective stator recesses. The last inserted segment will fit exactly into the first inserted segments, forming an annular fluidtight partition in the interior of the casing 10 when the cylindrical plates are extended from the ends of the stator core to the casing walls, or to an inner flange, as shown in FIG. 10.

Figure 15:
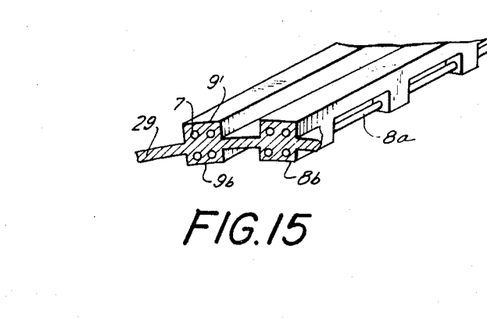
FIG. 15 is a fragmentary perspective view illustrating another modification of the embodiment of FIG. 13.

In the modification of FIG. 15, the cooling pipes 8a do not extend in circumferential direction as in the embodiment of FIG. 13, but are supported in axially extending bores 8b located in portions 9b of bar-shaped holding means 9' which project into the air gap. Since large portions of the cooling pipes 8a are exposed, good heat transfer contact with the turbulent region of the Taylor vortices is obtained.

FIG. 16 illustrates another modified cylindrical cooling structure with outer holding means 42 forming holding members 42a located in the unused portions of the stator recesses 2, and inner holding means 43 having projecting portions 43a projecting into the air gap. Projecting portions 42a and 43a register with each other, and form axially extending conduits 41 for the coolant. The outer and inner holding means 42, 43 may be divided into segments for assembly in the air gap. The thin wall portions between the projecting portions 42a and 43a, respectively, which fluidtightly abut each other, can be made of non-magnetic steel, metal having low electric losses, or cast of glass fiber or glass filament reinforced epoxy resin. The inner surface of the cylinder structure may be provided with a metal coating, if required. In the modified arrangement, not shown, only the inner holding means 43 is provided with conduits 41, similar to the construction of FIG. 7, and the outer holding means 42 is a cylindric plate.

In an electric machine in which the stator and rotor windings are internally cooled, there is no removal of air at atmospheric or subatmospheric pressure, and the entire heat transfer between the hot rotor and the cooling structure in the air gap, depends on the heat transfer by radiation and, to a certain extent, by convection.

In order to improve the condition for the largest electric machines, FIGS. 17 and 18 illustrate an embodiment in which a vapor-tight cylindrical plate 63 has projecting portions 65 respectively secured in the unused inner portions of the stator recesses 2. A pipe 60 is secured in a corresponding recess under the projection 65, only one pipe 60 being shown in FIG. 18. Each pipe 60 terminates at one end with an airless spray head 61, while a high pressure header 66 is connected to the other end. A vaporizable liquid, such as water or freon is supplied under pressure from header 66 by means of a flexible hose 62 and pipe 60 to the airless spray head 61 so that the liquid is sprayed over the outer cylindrical surface of the hot rotating rotor 14, and consequently vaporized. The cylindrical plate 63 is extended beyond the ends of stator core 1, and closed by end members 63b engaging bearings 14a, so that an inner rotor space 67 is formed which communicates with the air gap 50. The vapor in the rotor space 67 is removed by the exhauster or pump 68, as described in my U.S. Pat. No. 3,240,967. Several spray heads 61 with pipes 60 and 62 are provided in the electric machine, and are disposed only along the upper portion of the vapor-tight cylindrical body 63. The number of spray heads depends on the length of the rotor, the angle of the spray, which is between 120° and 150°, and the width of the air gap. Airless spray heads 61 are used which transform the sprayed liquid into droplets having a size of a few microns of an inch, so that a possible electric discharge is prevented. The spray is only used for the removal of heat losses generated on the rotor surface and in the air gap. The present invention permits the efficient use of sprayed liquid for cooling the air gap because the larger heat losses generated in the rotor winding, are removed by liquid circulating in conduits within the rotor windings, as disclosed in my U.S. Pat. No. 2,898,484.

In a modified construction the vapors of the spray are not totally exhausted, but are condensed on the cold surface of the cooling means and repeatedly evaporated and condensed.

In the embodiment of FIG. 19, so-called "heat pipes" are used instead of the cooling pipes. Heat pipes are a relatively new development, and constitute a cooling means of very high thermal conductivity. A flow of heat is obtained within a closed container, such as a pipe, by means of capillary action, and heat is transported from one end to the other of the heat pipe in the form of latent heat of vaporization. It is well known that heat pipes are capable of transporting large fluxes with a very small temperature gradient.

As shown in FIG. 19, heat pipes 70 are located in the air gap 50, and mounted in bar-shaped holding means 73 which are inserted into, and secured to the inner unused open-recess portions of the stator. A condenser 71, consisting of a non-magnetic metal, or of a material having low electric losses, is located in the inner rotor space 74 formed by a wall of casing 10, and of two conical wall portions 21a and 21b which project from the ends of the stator core 1. However, it is possible to place the condenser outside of casing 10, and to pass heat pipe 70 through an opening in casing 10.

Each heat pipe operates independently to covey heat from the air gap 50 to the condenser 71, and therefore breakdown of one or several heat pipes, causes no harm to the electric machine. Even if several heat pipes loose their very small quantity of working fluid during the operation of the electric machine, the vapors which form are exhausted by the pump, not shown, which is connected to the inner rotor space similar to pump 20 in FIG. 10. It is sufficient to replace inoperative heat pipes only when the electric machine is being repaired or serviced. This is the great advantage over the cooling pipes of the other embodiments, through which fresh liquid is continually circulated so that in the event of a leakage in one or more cooling pipes, the machine has to be stopped to prevent flooding of its interior.

It will be understood that each of the elements described above, or two or more together, may also find a useful application in other types of cooling arrangements for dynamoelectric machines differing from the types described above.

While the invention has been illustrated and described as embodied in a cooling arrangement comprising holding means secured to the inner open recess portions of the stator and supporting cooling pipes adjacent, or in the air gap, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Cooling arrangement for a dynamoelectric machine, comprising casing means; stator means supported in the casing means and having an annular inner portion formed with teeth and with recesses between said teeth, and internally cooled stator winding means located in the outer bottom portions of said recesses partly filling said recesses so that inner open recess portions remain free; rotor means mounted in said casing means for rotation and including internally cooled rotor winding means, said rotor means having an annular outer portion defining an annular air gap with said annular inner portion; and cooling means including a plurality of rigid holding means located in said open recess portions of said stator means, respectively, fixedly secured to the inner portions of the teeth adjacent the respective inner open recess portion, and a plurality of conduit means for a coolant, supported by said holding means, respectively, and being spaced from each other in circumferential direction of said annular air gap for cooling said annular inner portion of said stator means and said annular outer portion of said rotor means bounding said annular air gap.

2. Cooling arrangement as claimed in claim 1 wherein each said holding means includes an axially extending row of outer holding members secured in the outer part of the respective inner open recess portion, and an axially extending row of inner holding members secured in the inner part of the respective inner open recess portion; and wherein said cooling conduit means for the coolant are pipe means clamped between said outer and inner holding members.

3. Cooling arrangement as claimed in claim 2 wherein said holding members of at least said row of inner holding members are spaced from each other in axial direction.

4. Cooling arrangement as claimed in claim 1 and wherein said conduit means include conduits passing through said holding means.

5. Cooling arrangement as claimed in claim 4 wherein said holding means include axially elongated holding members at least partly located in said inner open recess portions, respectively, secured to the same; and wherein at least one conduit is formed in at least some of said holding members.

6. Cooling arrangement as claimed in claim 5 wherein said holding means include axially spaced rings connecting said holding members and forming a removable structure with the same.

7. Cooling arrangement as claimed in claim 1 wherein said inner open recess portions have a radial depth at least equal to the radial extension of said cooling means so that said cooling means do not inwardly project into said gap.

8. Cooling arrangement as claimed in claim 1 wherein said inner open recess portions have a radial depth less than the radial extension of said cooling means so that said cooling means project into said gap.

9. Cooling arrangement as claimed in claim 8 wherein said holding means are fixedly secured in said inner open recess portions and having inner portions radially projecting from the same into said gap; and wherein said conduit means include conduits in said inner projecting portions.

10. Cooling arrangement as claimed in claim 1 wherein said holding means include an axially extending row of outer holding members fitting in the outer part of each inner open recess portion and secured to the same, and an axially extending row of inner holding members secured in the inner part of said inner open recess portion; wherein said outer holding members are formed with inward facing grooves, and said inner holding members are formed with outward facing grooves respectively registering with said inward facing grooves; and wherein said conduit means include cooling pipes, each cooling pipe being located between and fitting into confronting and registering pairs of grooves and being clamped between said outer and inner holding members.

11. Cooling arrangement as claimed in claim 1 wherein said holding means comprise inner holding plates bent to form outward facing grooves; and cooling pipes fitting into said grooves and supported by said inner holding plates.

12. Cooling arrangement as claimed in claim 1 wherein said holding means include bar-shaped axially extending holding means at least partly located in said inner open recess portions respectively and having inner portions radially projecting from the same into said gap, and axially spaced circumferentially extending means connecting said holding means and forming a removable structure with the same; and wherein said conduit means include axially extending conduits formed in said bar-shaped holding means.

13. Cooling arrangement as claimed in claim 12 wherein at least some of said conduits are formed in said radially projecting portions of said holding means.

14. Cooling arrangement as claimed in claim 12 wherein said axially spaced means include a plurality of axially spaced rings for forming said removable structure.

15. Cooling arrangement as claimed in claim 12 including circumferentially extending bores penetrating said radially projecting portions of said holding means; and wherein said conduit means include cooling pipes passing through said bores and having portions extending in circumferential direction in said gap.

16. Cooling arrangement as claimed in claim 12 wherein said stator means includes a stator core having said annular inner portion forming a stator bore in which said structure is located, said stator core having ends spaced from said casing means; and wherein said stator means further include a pair of tubular walls respectively extending between the ends of said structure and said casing means so as to partition the interior of said casing means into a fluidtight outer space, and a fluidtight inner space in which said rotor means and said gap are located.

17. Cooling arrangement as claimed in claim 12 wherein said holding means, said axially spaced means, and said conduit means are at least partially made of fiberglass reinforced thermosetting resin in which metal particles re embedded.

18. Cooling arrangement as claimed in claim 12 wherein said axially spaced means include a plurality of segments so that said segments of said structure can be separately inserted into said gap and inner open recess portions.

19. Cooling arrangement as claimed in claim 1 wherein each holding means includes an outer holding member and an inner holding member; and wherein said conduit means include a plurality of cooling pipes clamped between said outer and inner holding members.

20. Cooling arrangement as claimed in claim 1 wherein said conduit means include and conduits passing through said holding means; and wherein said holding means consist of an insulating material having a very high electric resistance.

21. Cooling arrangement as claimed in claim 1, wherein said conduit means include cooling pipe means supported by said holding means.

22. Cooling arrangement as claimed in claim 1, wherein said conduit means are straight and parallel and extend in axial direction of said rotor means.

23. Cooling arrangement for a dynamoelectric machine, comprising casing means; stator means supported in the casing means and having an annular inner portion formed with teeth and with recesses between said teeth, and internally cooled stator winding means located in the outer bottom portions of said recesses partly filling said recesses so that inner open recess portions remain free; rotor means mounted in said casing means for rotation and including internally cooled rotor winding means, said rotor means having an annular outer portion defining an annular air gap with said inner portion; and cooling means comprising conduit means for a coolant, and being at least partly located in said inner open recess portions for cooling said annular inner and outer portions bounding said air gap; said conduit means including a plurality of bar-shaped axially extending holding means at least partly located in said inner open recess portions, respectively, and having inner portions radially projecting from the same into said gap, and annular means connecting said holding means and forming a removable structure with the same, said conduit means including axially extending conduits formed in said bar-shaped holding means, and spraying tubes and spraying heads for spraying and vaporizing a coolant in said air gap, and means for evacuating vapors from said air gap.

24. Cooling arrangement for a dynamoelectric machine, comprising casing means; stator means supported in the casing means and having an annular inner portion formed with teeth and with recesses between said teeth, and internally cooled stator winding means located in the outer bottom portions of said recesses partly filling said recesses so that inner open recess portions remain free; rotor means mounted in said casing means for rotation and including internally cooled rotor winding means, said rotor means having an annular outer portion defining an annular air gap with said annular inner portion; and cooling means comprising conduit means for a coolant, and being at least partly located in said inner open recess portions for cooling said annular inner and outer portions bounding said air gap; said conduit means including a plurality of bar-shaped axially extending holding means at least partly located in said inner open recess portions, respectively, and having inner portions radially projecting from the same into said gap, and annular means connecting said holding means and forming a removable structure with the same, said conduit means including axially extending conduits formed in said bar-shaped holding means, and spraying tubes and spraying heads for spraying and vaporizing a coolant in said air gap, wherein the sprayed coolant is condensed on the cold surface of said cooling conduit means.

25. Cooling arrangement for a dynamoelectric machine, comprising casing means; stator means supported in said casing means and including an annular inner portion having teeth forming an inner annular stator surface and being separated by recesses, and internally cooled stator winding means located in the outer bottom portions of said recesses; rotor means mounted in said casing means for rotation and including internally cooled rotor winding means, said rotor means having an annular outer rotor surface defining an annular air gap with said inner annular stator surface; and cooling means including a tubular holding structure secured to said inner annular stator surface, and conduit means including spraying means for a coolant supported by said tubular structure in the free portion of said air gap between said tubular holding structure and said annular outer rotor surface for spraying the coolant onto said annular outer rotor surface.

26. Cooling arrangement for a dynamoelectric machine, comprising casing means; stator means supported in said casing means and including an annular inner portion having teeth separated by recesses and having inner end faces forming an annular inner stator surface, internally cooled stator winding means located in the outer bottom portions of said recesses partly filling said recesses so that inner open recess portions remain free, and a pair of tubular walls respectively extending between the ends of said annular inner portion and said casing means, the annular inner surfaces of said tubular walls being flush with said annular inner stator surface; rotor means mounted in said casing means for rotation and including internally cooled rotor winding means, said rotor means having an annular outer rotor surface defining an air gap with said annular inner stator surface; and cooling means including a plurality of rigid holding means located in said inner open recess portions, respectively, fixedly secured to the inner portions of the teeth adjacent the respective inner open recess portion, and a plurality of conduit means for a coolant, supported by said holding means and located in said inner open recess portions, respectively, the inner surfaces of said holding means being flush with said inner end faces of said teeth and with said inner annular stator surface for reducing windage losses.

27. Cooling arrangement as claimed in claim 26, wherein said holding means include axially extending holding bars located in said recesses and having projecting portions axially projecting from the ends of said rotor means; and wherein said tubular walls include said projecting portions of said holding bars, and axially extending connecting bars between said projecting portions of said holding bars abutting the same and forming with the same said tubular walls.

28. Cooling arrangement for a dynamoelectric machine, comprising casing means; stator means supported in the casing means and having an annular inner portion formed with teeth and with recesses between said teeth, and internally cooled stator winding means located in the outer bottom portions of said recesses partly filling said recesses so that inner open recess portions remain free; rotor means mounted in said casing means for rotation and including internally cooled rotor winding means, said rotor means having an annular outer portion defining an annular air gap with said annular inner portion; and cooling means including a plurality of holding means fixedly secured in said open recess portions of said stator means, respectively, and a plurality of conduit means for a coolant, supported by said holding means, respectively, and being spaced from each other in circumferential direction of said annular air gap for cooling said annular inner portion of said stator means and said annular air gap, said inner open recess portions having a radial depth less than the radial extension of said cooling means so that said cooling means project into said gap, said holding means being fixedly secured in said inner open recess portions and having inner portions radially projecting from said open recess portions into said gap; and said conduit means including cooling pipe means forming conduits in said inner projecting portions.

29. Cooling arrangement for a dynamoelectric machine, comprising casing means; stator means supported in the casing means and having an annular inner portion formed with teeth and with recesses between said teeth, and internally cooled stator winding means located in the outer bottom portions of said recesses partly filling said recesses so that inner open recess portions remain free; rotor means mounted in said casing means for rotation and including internally cooled rotor winding means, said rotor means having an annular outer portion defining an annular air gap with said annular inner portion; and cooling means including a plurality of holding means fixedly secured in said open recess portions of said stator means, respectively, and a plurality of conduit means for a coolant, supported by said holding means, respectively, and being spaced from each other in circumferential direction of said annular air gap for cooling said annular inner portion of said stator means and said annular outer portion of said rotor means bounding said annular air gap, said conduit means including pipe means held by said holding means and having spray head means for spraying a vaporizing coolant into said gap.

30. Cooling arrangement for a dynamoelectric machine, comprising casing means; stator means supported in the casing means and having an annular inner portion formed with teeth and with recesses between said teeth, and internally cooled stator winding means located in the outer bottom portions of said recesses partly filling said recesses so that inner open recess portions remain free; rotor means mounted in said casing means for rotation and including internally cooled rotor winding means, said rotor means having an annular outer portion defining an annular air gap with said annular inner portion; and cooling means including a plurality of holding means fixedly secured in said open recess portions of said stator means, respectively, and a plurality of conduit means for a coolant, supported by said holding means, respectively, and being spaced from each other in circumferential direction of said annular air gap for cooling said annular inner portion of said stator means and said annular outer portion of said rotor means bounding said annular air gap, said conduit means comprising heat pipe means supported by said holding means and extending in axial direction between and beyond the axial ends of said gap for exerting a capillary action on a coolant so that the coolant moves in said heat pipe means toward one of said ends; and condenser means located in said casing means at the end of said heat pipe means to which heat is conveyed, said condenser means being located at one of said ends of said gap.

31. Cooling arrangement for a dynamoelectric machine, comprising casing means; stator means supported in the casing means and having an annular inner portion formed with teeth and with recesses between said teeth, and internally cooled stator winding means located in the outer bottom portions of said recesses partly filling said recesses so that inner open recess portions remain free; rotor means mounted in said casing means for rotation and including internally cooled rotor winding means, said rotor means having an annular outer portion defining an annular air gap with said annular inner portion; and cooling means including a plurality of holding means fixedly secured in said open recess portions of said stator means, respectively, and a plurality of conduit means for a coolant, supported by said holding means, respectively, and being spaced from each other in circumferential direction of said annular air gap for cooling said annular inner portion of said stator means and said annular outer portion of said rotor means bounding said annular air gap, said holding means including bar-shaped axially extending holding means at least partly located in said inner open recess portions, respectively, and having inner portions radially projecting from the same into said gap, and axially spaced circumferentially extending means connecting said holding means and forming a removable structure with the same, said conduit means including axially extending conduits formed in said bar-shaped holding means, said conduit means comprising heat pipe means supported by said holding means and extending in axial direction between and beyond the axial ends of said annular gap; and comprising a condenser means for removing of heat losses from said air gap.

* * * * *